United States Patent
Sweney et al.

(10) Patent No.: US 11,220,450 B2
(45) Date of Patent: Jan. 11, 2022

(54) PROCESS TO MAKE TEXTURED GLASS

(71) Applicant: Tesla, Inc., Palo Alto, CA (US)

(72) Inventors: William S. Sweney, Oakland, CA (US); Michael Pilliod, Los Angeles, CA (US); Christos Gougoussis, Cupertino, CA (US)

(73) Assignee: Tesla, Inc., Palo Alto, CA (US)

(*) Notice: Subject to any disclaimer, the term of this patent is extended or adjusted under 35 U.S.C. 154(b) by 231 days.

(21) Appl. No.: 16/269,032

(22) Filed: Feb. 6, 2019

(65) Prior Publication Data

US 2019/0241455 A1 Aug. 8, 2019

Related U.S. Application Data

(60) Provisional application No. 62/627,061, filed on Feb. 6, 2018.

(51) Int. Cl.

| | |
|---|---|
| *C03B 13/08* | (2006.01) |
| *C03B 13/16* | (2006.01) |
| *B33Y 10/00* | (2015.01) |
| *C03B 11/08* | (2006.01) |

(Continued)

(52) U.S. Cl.
CPC .......... *C03B 11/082* (2013.01); *C03B 11/125* (2013.01); *C03B 13/08* (2013.01); *C03B 13/16* (2013.01); *B33Y 10/00* (2014.12); *B33Y 70/00* (2014.12); *C03B 2215/06* (2013.01); *C03B 2215/07* (2013.01); *C03B 2215/11* (2013.01); *C03B 2215/16* (2013.01);

(Continued)

(58) Field of Classification Search
None
See application file for complete search history.

(56) References Cited

U.S. PATENT DOCUMENTS

| | | | |
|---|---|---|---|
| 10,518,446 B1* | 12/2019 | Jenkins | ............... B29C 45/7331 |
| 2008/0096025 A1* | 4/2008 | Minazawa | ............ C03B 11/088 |
| | | | 428/426 |
| 2021/0061699 A1* | 3/2021 | Azuma | .................. C03B 33/091 |

FOREIGN PATENT DOCUMENTS

JP 2001172029 A * 6/2001 ............. C03B 11/08

OTHER PUBLICATIONS

JP-2001172029-A EPO Machine Translation Performed Mar. 8, 2021. (Year: 2021).*

(Continued)

*Primary Examiner* — Lisa L Herring
(74) *Attorney, Agent, or Firm* — Knobbe, Martens, Olson & Bear, LLP (57) ABSTRACT

Systems and methods for texturing substrates (e.g., glass, metal, and the like) and the textured substrates produced using such systems and methods are disclosed. An exemplary textured substrate includes a surface having a portion with a root-mean-square roughness between 40 to 1000 microns and an autocorrelation function greater than 0.5 for distances less than 50 microns. An exemplary system for texturing a substrate includes a plunger with a textured surface, where a portion of the textured surface has a root-mean-square roughness between 40 to 1000 microns and an autocorrelation function greater than 0.5 for distances less than 50 microns. An exemplary method for texturing a substrate includes the steps of generating a pattern defining a texture, and 3-D printing the pattern on the substrate to form the texture.

24 Claims, 11 Drawing Sheets

(51) Int. Cl.
*C03B 11/12* (2006.01)
*B33Y 70/00* (2020.01)

(52) U.S. Cl.
CPC .... *C03B 2215/41* (2013.01); *C03B 2215/412* (2013.01); *C03B 2215/50* (2013.01)

(56) References Cited

OTHER PUBLICATIONS

Zhang et al., "The effect of autocorrelation length on the real area of contact and friction behavior of rough surfaces", Journal of Applied Physics 97, 103526 (2005), 7 pages. (Year: 2005).*
Kumar et al.m "AFM Studies On Surface Morphology, Topography and Texture of Nanostructured Zinc Aluminum Oxide Thin Films", Digest Journal of Nanomaterials and Biostructures vol. 7, No. 4, Oct.-Dec. 2012, p. 1881-1889. (Year: 2012).*
Kazmer, "Three-Dimensional Printing of Plastics", Applied Plastics Engineering Handbook (Second Edition), 2017, pp. 617-634. (Year: 2017).*

* cited by examiner

| Name | Hamiltonian | Parameter Values | Autocorrelation | Texture Sample |
|---|---|---|---|---|
| H0 | $H(M) = 0$ | Pixel Size = 50 Microns | | |
| H1 | $H(M) = \sum_{r,s} a M_{r,s}^2 + b (\Delta M)_{r,s}$ | Pixel Size = 80 microns, $a = 10^{-2}$, $b = 10^{-11} m^2$, $T = 1.0$ | | |

FIG. 6A

| Name | Hamiltonian | Parameter Values | Autocorrelation | Texture Sample |
|---|---|---|---|---|
| H2 | $H(M) = \sum_{r,s} a \, (M_{r,s}^4 - 2M_{r,s}^2)$ $+ c \tanh\left(\frac{1}{n} M_{r,s} \sum_{k=1}^{n}\right)$ $\left[\phi(\|\vec{D}\|) \, z\left(\vec{P}_{r,s} \begin{bmatrix} e & 0 \\ 0 & 1/e \end{bmatrix} \vec{D}\right)\right]$ | pixel size = 80 microns, $T = 0.6$, $a=0.1$, $c=4.0$, $g=480$ microns, $\phi(u) = -1$ if $u < 1$, $\phi(u) = 1$ if $1.2 < u < 2$ and $\phi(u) = 0$ otherwise. $z(\vec{p}_{r,s})$ is the interpolated value of the matrix $M$ corresponding to the cell $r, s$. $\vec{p}_{r,s}$ is the point of coordinates $x, y$ corresponding to $r, s$. $\vec{D}$ is a random 2D vector with isotropic distribution and gaussian radial distribution generated by the absolute value of the centered normal distribution of standard deviation 1. Both appearances of $\vec{D}$ in the formula correspond to a single evaluation of the random vector, but each different point corresponds to a different evaluation. | | |

FIG. 6B

| Name | Hamiltonian | Parameter Values | Autocorrelation | Texture Sample |
|---|---|---|---|---|
| H3 | $H(M) = \sum_{r,s} a\,(M_{r,s}^4 - 2M_{r,s}^2)$ $+ ctanh\left(\frac{1}{n}M_{r,s}\sum_{k=1}^{n}\right.$ $\left.\left[\phi(\|\vec{D}\|)z(\vec{p}_{r,s})\right]\right.$ $\left.+ g\begin{bmatrix}e & 0 \\ 0 & 1/e\end{bmatrix}\vec{D}\right])$ | Same as above except $e = 0.47$. | (autocorrelation plot, r in microns 0–1000) | (texture sample image) |

FIG. 6C

| Texture Sample |  |  |  |
|---|---|---|---|
| $f(x,y)$ | $f(x,y) = 1$ | $f(x,y) = 1 + \sin(x/a)/2$, $a = 400$ microns, pixel size = 80 microns | $f(x,y) = 1 + sgn(\sin(x/a)) \sin(y/b)/2$, $a = 400$ microns, $b = 800$ microns, pixel size = 80 microns |

PROCESS TO MAKE TEXTURED GLASS

CROSS-REFERENCE TO RELATED APPLICATIONS

This application claims priority to U.S. Provisional Patent Application No. 62/627,061, entitled "PROCESS TO MAKE TEXTURED GLASS," filed on Feb. 6, 2018, the contents of which are hereby incorporated by reference in its entirety.

FIELD

The present disclosure generally relates to textured glass, and more specifically to systems and methods for precisely controlling the texture of textured glass.

BACKGROUND

Traditional methods for texturing glass include pressing molten glass with textured tools, thereby transferring the texture of the tool onto the glass. Textures are applied to these tools using traditional methods such as sandblasting, electrical discharge machining (EDM), fine/rough machining, and laser/chemical etching. However, these traditional methods are unable to precisely control the texture applied to the tools (e.g., at scales below 500 microns), and thus are unable to precisely control the texture applied to the glass.

In some instances, it is desirable to more precisely control the texture applied to substrates (e.g., glass). For example, more precise texture control may enable manufacturing of improved glass having low and controllable gloss while maintaining high transmissivity (e.g., 80 percent transmission). Such glass may be desirable for use in, for example, rooftop solar panels. In addition, precise control of the texture of glass can enable improved control of glass appearance, thus allowing the manufacture of glass with desired aesthetic properties (e.g., glass having the appearance of tree bark, roofing material, etc.) while preserving desired optical properties (e.g., low gloss, high transmissivity, etc.).

BRIEF SUMMARY

Systems and methods for texturing substrates (e.g., glass, metal, and the like) and the textured substrates produced using such systems and methods are disclosed. An exemplary textured substrate includes a surface having a portion with a root mean square roughness between 40 to 1000 microns and an autocorrelation function greater than 0.5 for distances less than 50 microns. An exemplary system for texturing a substrate includes a plunger with a textured surface, where a portion of the textured surface has a root-mean-square roughness between 40 to 1000 microns and an autocorrelation function greater than 0.5 for distances less than 50 microns. An exemplary method for texturing a substrate includes the steps of generating a pattern defining a texture, and 3-D printing the pattern on the substrate to form the texture.

DETAILED DESCRIPTION

The following description is presented to enable a person of ordinary skill in the art to make and use the various embodiments. Descriptions of specific systems, devices, methods, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

1. Systems for Texturing Substrates

Figure 1:
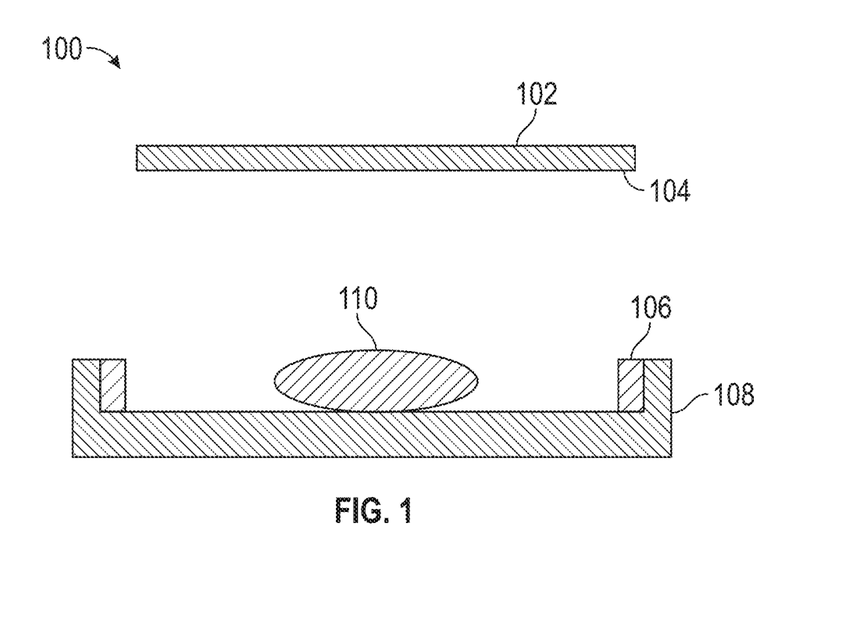
FIG. 1 depicts a conventional mold used for texturing substrates.

FIG. 1 shows a conventional mold 100 used for texturing substrates (e.g., glass, metal, ceramic, etc.). Mold 100 includes plunger 102 including textured surface 104, ring 106, and base 108. To texture a substrate (e.g., molten glass 110), a press (not shown) applies pressure to plunger 102, causing plunger 102 to press molten glass 110, thereby transferring the texture of textured component 104 (and the texture of ring 106 and of base 108) onto molten glass 110.

As discussed, the texture of textured component 104 is applied using conventional methods such as sandblasting, electrical discharge machining (EDM), fine/rough machining, and laser/chemical etching. However, these conventional methods may be unable to precisely control the texture applied textured surface 104. For example, sandblasting methods cannot control the textures applied to substrates at scales below the diameter of the sand grains used and require complex and cumbersome use of masks to obtain spatially varying textures. Chemical etching methods cannot control the texture at scales below approximately 100 microns and are not suitable to obtain spatial variation in texture depth. Further, sandblasting and chemical etching methods may be undesirable because they can physically weaken substrates.

Further, the optical properties (e.g., the gloss) of substrates (e.g., glass) produced by these conventional methods may be difficult to control. For example, conventional laser etching methods use laser pulses to etch a surface (e.g., the surface of a roller) for texturing glass. Each laser pulse removes an approximately square or circular area (e.g., of 1600 square microns) with a depth of approximately 50 microns from the surface, resulting in a textured surface, and thus textured glass, with a step-like or "terrace-like" structure. Because of this step-like structure, light impinging on the glass scatters within a limited range of angles, resulting in textured glass with undesirably high gloss. Because conventional laser etching produces glass with such step-like structure, conventional laser etching methods are inherently limited in their ability to control the gloss of textured glass (e.g., because of the limited range of scattering angles available on the step-like surface).

3-D printing using laser sintering to form textures may produce a smoother surface (e.g., a smooth, non-step like surface) on textured substrates. A greater range of scattering angles is available for light impinging on substrates with such smoother surface, resulting in substrates with lower gloss. Additionally, because 3-D printing techniques are highly controllable (e.g., the texture is defined in a CAD or STL file) on small scales (e.g., scales below 50 microns), 3-D printing methods may enable precise user-control of both the optical properties (e.g., gloss and transmissivity) and the aesthetic properties of textured substrates. Exemplary techniques for generating textures, which are then formed on substrates using 3-D printing are discussed with respect to FIGS. 4-11 below. Precise control of the texture of substrates produced using the 3-D printing techniques disclosed herein may not be achievable by conventional methods of texturing substrates.

Figure 2:
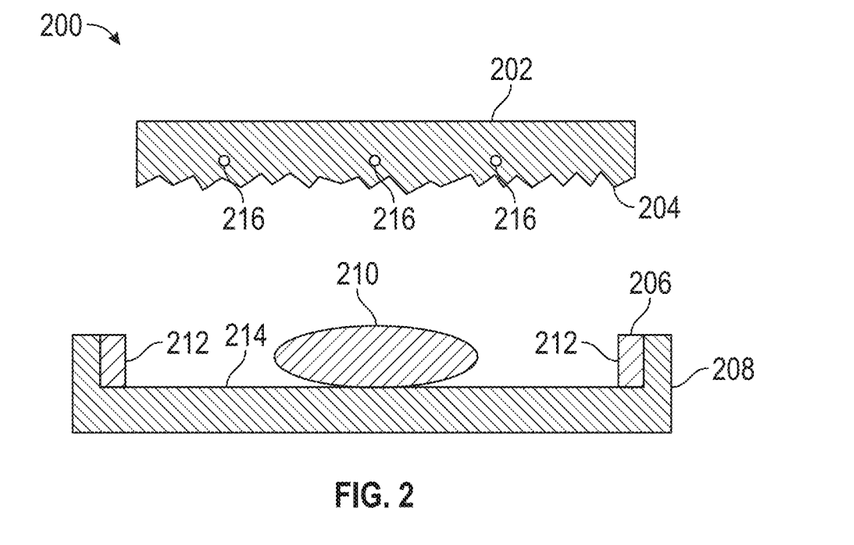
FIG. 2 depicts a mold used for texturing substrates according to some examples.

FIG. 2 shows an exemplary mold 200 that precisely and controllably textures substrates (e.g., glass gob 210) according to some examples. Mold 200 includes plunger 202 including textured surface 204, ring 206, and base component 208. In some examples, the texture is formed on textured surface 204 using 3-D printing techniques (e.g., laser sintering). In some examples, textured surface 204 has a root mean square roughness between 40 to 1000 microns and an autocorrelation function greater than 0.5 for distances less than 50 microns.

In some examples, ring 206 includes textured surface 212 and/or base 208 includes textured surface 214. In some examples, the properties (e.g., the root mean square roughness, the autocorrelation function) of textured surfaces 212 and 214 are the same as the properties of textured surface 204. In other examples, the properties of textured surfaces 212 and 214 differ from the properties of textured surface 204. In some examples, plunger 202, ring 206, base 208, and textured surfaces 204, 212, and 214 are made of the same materials such that the components of mold 200 wear uniformly.

In some examples, the texture of each of the textured surfaces 204, 212, and 214 is defined by a respective pattern (e.g., pattern defined in a CAD or an STL file.) A 3D printing process prints the texture of each of the respective patterns onto textured surfaces 204, 212, and 214.

For example, additive manufacturing processes such as laser sintering of a metal powder onto textured surface 204 forms the texture of surface 204 from according to a defined pattern. In some examples, the sintered metal powder includes any elemental metal or includes any alloy containing at least 20 percent in mass of iron, chrome, nickel, cobalt, vanadium, tungsten, molybdenum, aluminum, copper, titanium, platinum, osmium, iridium, or zinc. Exemplary preferred alloys include a cobalt-chrome alloy or Inconel. In some examples, textured surfaces 204, 212, and 214 are coated with chromium (e.g., a 20 micron layer of chromium). Coating textured surfaces 204, 212, and 214 with chromium can improve the respective durability of plunger 202, ring 206 and base 208.

In some examples, any one of textured surfaces 204, 212, and 214 (and/or any one of plunger 202, ring 206, and base 208) are ceramic, and 3D ceramic printing processes form the respective textures of surfaces 204, 212, and 214. Having ceramic surfaces 204, 212, and 214 may improve the durability of mold 200.

In some examples, one or more of plunger 202, ring 206, and base 208, include one or more hollow channels 216. Fluids (e.g., molten salts such as KCl) circulate through one or more hollow channels 216, enabling heat exchange such that glass gob 210 cools quickly as glass gob 210 is being pressed by mold 200.

Although textured surfaces 204 and 214 shown in FIG. 2 are generally flat, it is to be understood that any of textured surfaces 204, 212, and 214 can be curved. For example, textured surface 212 is a cylindrical surface (e.g., the inner surface of ring 206). Further, the processes for generating and forming the textures of surfaces and substrates disclosed herein apply regardless of whether the surfaces or substrates are two-dimensional (e.g., a flat plane) or three-dimensional (e.g., a spherical or cylindrical surface).

Figure 3:
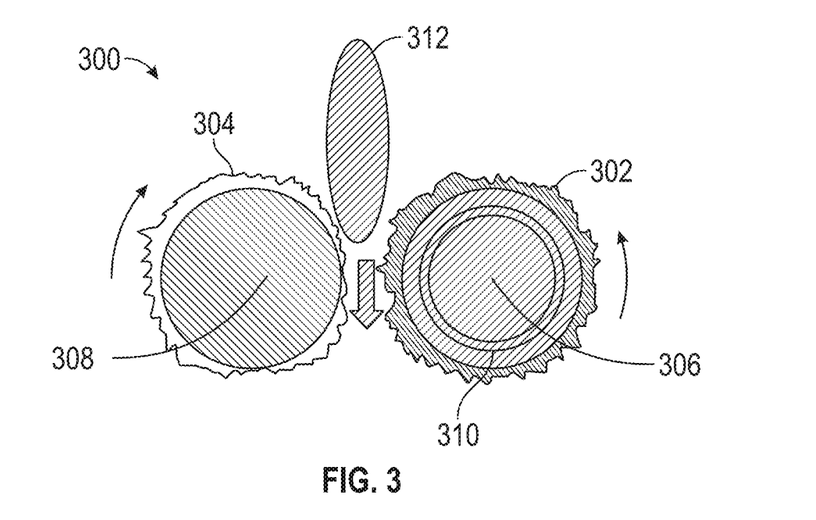
FIG. 3 depicts a mold used for texturing substrates according to some examples.

FIG. 3 depicts exemplary mold 300 for texturing substrates according to other examples. Mold 300 includes three dimensional textured surfaces 302 and 304. Mold 300 includes a first roller 306 including textured surface 302 and second roller 308 including textured surface 304. As shown in FIG. 3, both surfaces 302 and 304 are cylindrical surfaces. The textures of surfaces 302 and 304 are generated and formed using techniques analogous to those used to generate and form the textures of surfaces 204, 212, and 214 discussed above. In some examples, the properties of textured surfaces 302 and 304 are identical to the properties of textured surfaces 204, 212, and 214. For example, textured surface 302 has a root mean square roughness between 40 to 1000 microns and an autocorrelation function greater than 0.5 for distances less than 50 microns.

In some examples, any one of first roller 306 and second roller 308 include one or more hollow channels 310. Fluids (e.g., molten salts like KCl) circulate through one or more hollow channels 310, enabling heat exchange so that glass gob 312 cools quickly during pressing by mold 300.

2. Techniques for Texturing Substrates

Techniques for texturing substrates (e.g., glass) using molds 200 and 300 are now discussed. Referring to FIG. 2, in some examples, to texture glass gob 210 using mold 200, glass gob 210 is placed upon base 208. Pressure is applied from a press (not shown) onto plunger 202, causing plunger 202 to press textured surface 204 into a first surface of glass gob 210. The texture of surface 204 is thus applied to the first surface of glass gob 210 and the texture of surface 214 is thus applied to a second opposite surface of glass gob 210. In examples where mold 200 includes ring 206, the texture of surface 212 is also applied to a third surface of glass gob 210.

In some examples, the pressure applied by the press onto plunger 202 is between 1-100 MPa. In some examples, while being pressed by plunger 202, the temperature of glass gob 210 is between 800° C.-1600° C. In some examples, the pressure is applied to plunger 202 for a time between 0.2-20 seconds.

Referring to FIG. 3, to texture glass gob 312 using mold 300, in some examples, a first portion of glass gob 312 is positioned between first roller 306 and second roller 308. First roller 306 and second roller 308 rotate in opposite directions. For example, as shown in FIG. 3, first roller 306 rotates counter-clockwise and second roller 308 rotates clockwise.

After the first portion of glass gob 312 contacts the first roller 306 and the second roller 308, glass gob 312 passes between first roller 306 and second roller 308, thereby transferring the respective textures of surfaces 302 and 304 onto a respective first and second surface of glass gob 312.

In some examples, as glass gob 312 passes between first roller 306 and second roller 308, glass gob 312 is at a temperature between 800° C.-1600° C.

3. Techniques for Generating and Forming the Textures of Textured Substrates

Techniques for generating and forming the textures of textured substrates (e.g., surfaces 204, 212, 214, 302, and 304 and/or glass gobs 210 and 312) are now discussed.

In some examples, the texture of a textured substrate is defined using a two-dimensional matrix. For example, a height of the texture $z(x,y)$ at coordinates $(x,y)$ is defined by an index $(r,s)$ of a matrix M. In some examples, the heights $z(x,y)$ specified in the matrix M are relative to a mean height of the matrix. Thus, a matrix M, and a matrix $M'=M+C$, where C is a matrix of the same constant, refer to the same texture. A mesh (e.g., a pattern defining the texture) is computed from matrix M (or M') to produce a file (e.g., a CAD or STL file) that a 3-D printer uses to form the texture on a substrate. In some examples, the 3-D printer forms the texture on the substrate using the 3-D printing techniques (e.g., laser sintering of a metal powder) discussed above. Additionally, as discussed, in some examples, the textured substrate is coated with a protective layer (e.g., a 20 micron thick layer of chromium).

As discussed, using 3-D printing to form textures on a substrate may be preferable over conventional methods of texturing substrates (e.g., laser etching) because 3D printed textures have a smoother textured surface and because 3-D printing is controllable on small scales (e.g., below 50 microns). A smoother textured surface can enhance the optical properties (e.g., lower gloss) of textured substrates. Further, 3-D printing can enable the simultaneous printing of both the macroscopic shape of textured substrates and the small-scale textures of textured substrates. This can reduce the need for using multiple steps (e.g., first machining the substrate and then applying the texture to the substrate using conventional methods) when manufacturing textured substrates.

Figure 4:
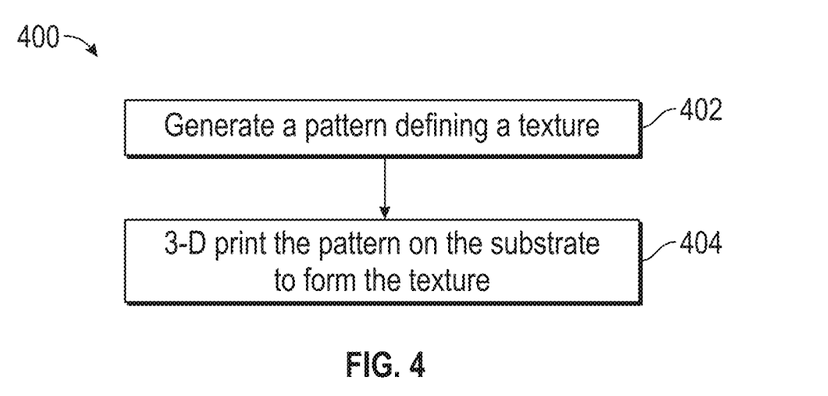
FIG. 4 illustrates a process for texturing a substrate according to some examples.

FIG. 4 depicts an exemplary process 400 for texturing a substrate. At block 402, a pattern (e.g., a mesh) defining a texture is generated. In some examples, as discussed below, the pattern has a root mean square roughness between 40 to 1000 microns and an autocorrelation function greater than 0.5 for distances less than 50 microns. At block 404, the pattern is 3-D printed (e.g., using additive laser sintering) onto the substrate to form the texture.

Because, in some examples, the pattern is defined by a user-specified matrix, the above discussed systems and techniques enable the ability to "program" individual features (e.g., grains) having a specified shape and orientation onto textured substrates. Of course, there is no lower limit on the resolution with which textures or patterns can be defined using matrix M. The resolution with which textures can be "programmed" onto substrates using such techniques is thus only limited by the resolution at which 3-D printers can transfer the programmed textured onto a substrate. Current 3-D printing techniques can transfer individual features of a characteristic length of approximately 25 to 50 microns onto substrates. Such programmable and controlled texturing of substrates at the sub 50 micron scale may not be achievable by conventional methods of texturing substrates (e.g., sandblasting, laser etching, chemical etching, machining etc.).

Further, because the disclosed techniques allow a user to "program" a texture onto a substrate, the above techniques enable precise user control over both the optical properties (e.g., reflectivity, transmissivity, gloss level, and the like) and the aesthetic properties of textured substrates. For example, using the disclosed techniques, a user can create a mesh defining a pattern (e.g., any set of peaks, valleys, and/or shapes) resembling the appearance of a specified design (e.g., tree bark, roofing tile, a picture) and 3-D print the pattern to form a textured substrate. Additionally, given the characteristics of the substrate on which the texture is formed (e.g., the index of refraction, reflectance, etc.) and the user-specified pattern, the optical properties of the resulting textured substrate can be readily determined. Accordingly, the disclosed systems and techniques may allow for a user to program textures onto substrates while balancing desired optical performance with desired aesthetic performance.

Exemplary techniques for generating the textures of textured substrates (e.g., generating the matrix M) and the properties of the textured substrates generated using such techniques are now discussed.

An exemplary technique for generating textures uses a stochastic processes with a parametric Hamiltonian H. The individual terms of the Hamiltonian each correspond to different spatial patterns (e.g., elliptical patterns, spatially uniform patterns), and by adding terms to the parametric Hamiltonian, different patterns are generated. Such stochastic processes can generate textures that appear random, but are controlled according to an underlying pattern (e.g., as defined by the parametric Hamiltonian).

An exemplary stochastic process using a parametric Hamiltonian uses a Metropolis-Hastings algorithm to generate patterns. Such process involves first initializing a $M_0$ matrix with random values, and computing a matrix $M_{n+1}$ from $M_n$ by randomly choosing an element $(r,s)$ of matrix $M_n$. A matrix A is then generated, where the value of the element $(r,s)$ is randomly modified. The parametric Hamiltonians, $H(M_n)$ and $H(A)$ are then respectively computed for $M_n$ and A. Then, $M_n$ or A is chosen the following way:

with probability $\exp(-h(M_n)/T)/(\exp(-h(M_n)/T)+\exp(-h(A)/T))$ then $M_{n+1}=M_n$;

with probability $\exp(-h(A)/T)/(\exp(-h(M_n)/T)+\exp(-h(A)/T))$ then $M_{n+1}=A$.

Here T is the "temperature" of the system. The "temperature" is chosen to be high enough such that the obtained texture appears random, but low enough such that the obtained texture is not entirely random, but controlled according to a pattern. The above process is then repeated until a statistically stable configuration is reached. For example, a statistically stable configuration is reached when doubling the number of iterations in the algorithm does not give a statistically significant difference in the autocorrelation function of the resultant matrix M (compared to if the number of iterations is not doubled) or does not significantly change the global appearance of the texture. In some examples, 200 iterations are performed for each pixel (e.g., matrix element). The final matrix M obtained at the last iteration of the algorithm defines the pattern. In some examples, the matrix M is multiplied by a coefficient representing a texture depth and the values of the matrix are limited to a defined range (e.g., −1 to 1). For example, multiplying the generated matrix M (with all values between −1 and 1) by a coefficient of 100 microns produces a matrix with a normalized 200 microns depth.

Figure 5A:
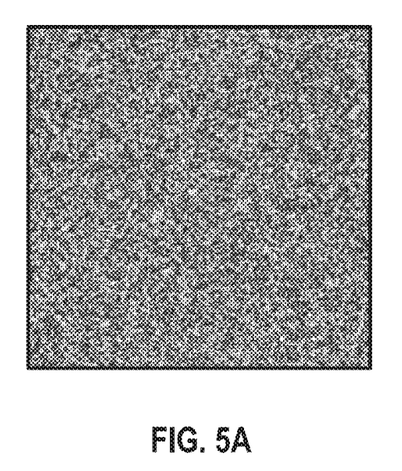
FIGS. 5A-5D respectively illustrate, an exemplary height map corresponding to a texture, a 3-D mesh corresponding to the height map, a 3-D printed metal piece printed using the 3-D mesh, and a glass piece pressed using the metal piece.
Figure 5B:
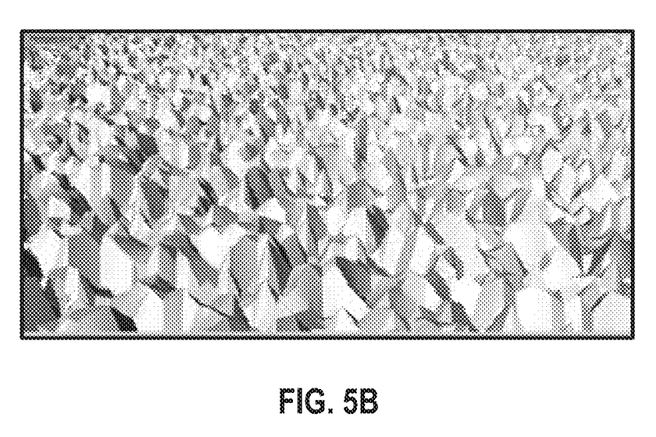
Figure 5C:
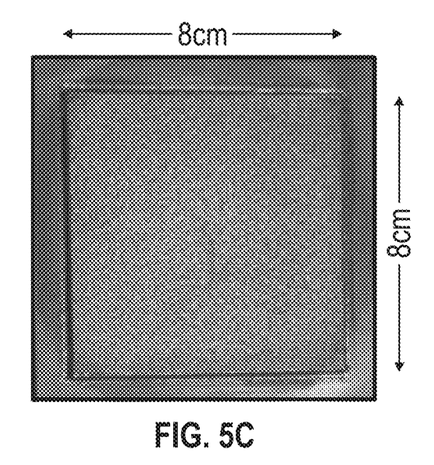
Figure 5D:
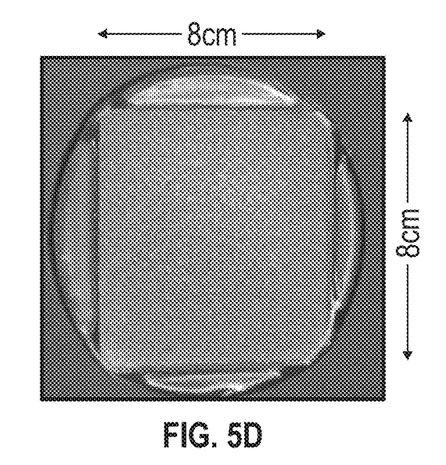
Figure 6A:
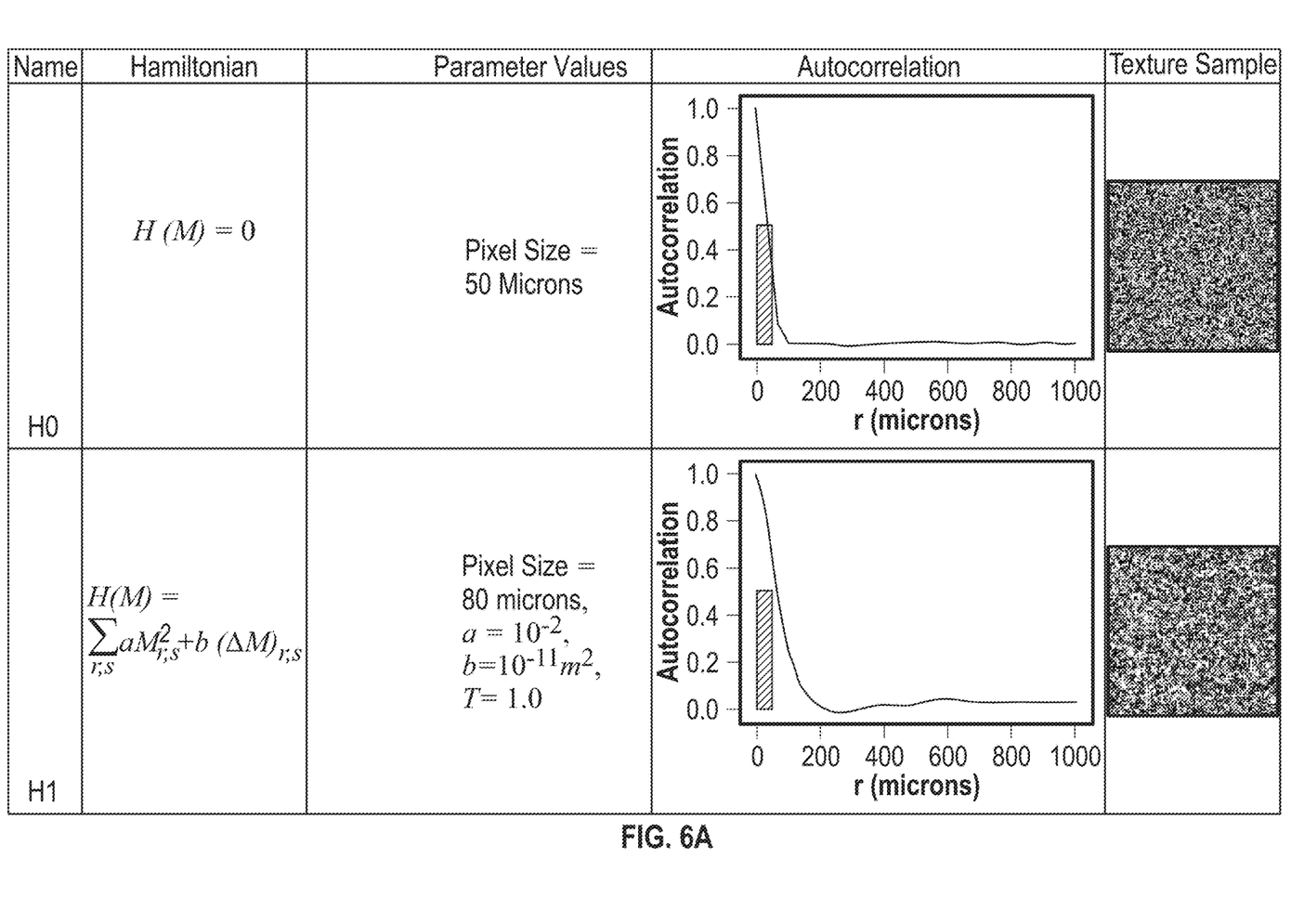
FIGS. 6A-6C illustrate exemplary terms that are added to a Hamiltonian, and the respective textures the terms produce when the terms are used in the Hamiltonian for an exemplary Metropolis-Hastings algorithm.

FIG. 5A shows a height map of an exemplary texture generated using the aforementioned Metropolis-Hastings algorithm with the Hamiltonian H1 shown in FIG. 6A. Darker regions indicate valleys, while brighter regions indicate peaks. The typical grain size of the texture is 50 to 80 microns, and the root mean squared (RMS) depth of the texture is 150 microns. FIG. 5B shows the mesh (e.g., pattern) for the texture in FIG. 5A, FIG. 5C shows a metal surface of approximately 8 cm×8 cm (e.g., surface 204) 3-D printed using the mesh in FIG. 5B, and FIG. 5D shows a glass piece (e.g., a textured substrate) of approximately 8 cm×8 cm pressed using the metal surface of FIG. 5C.

Figure 6B:
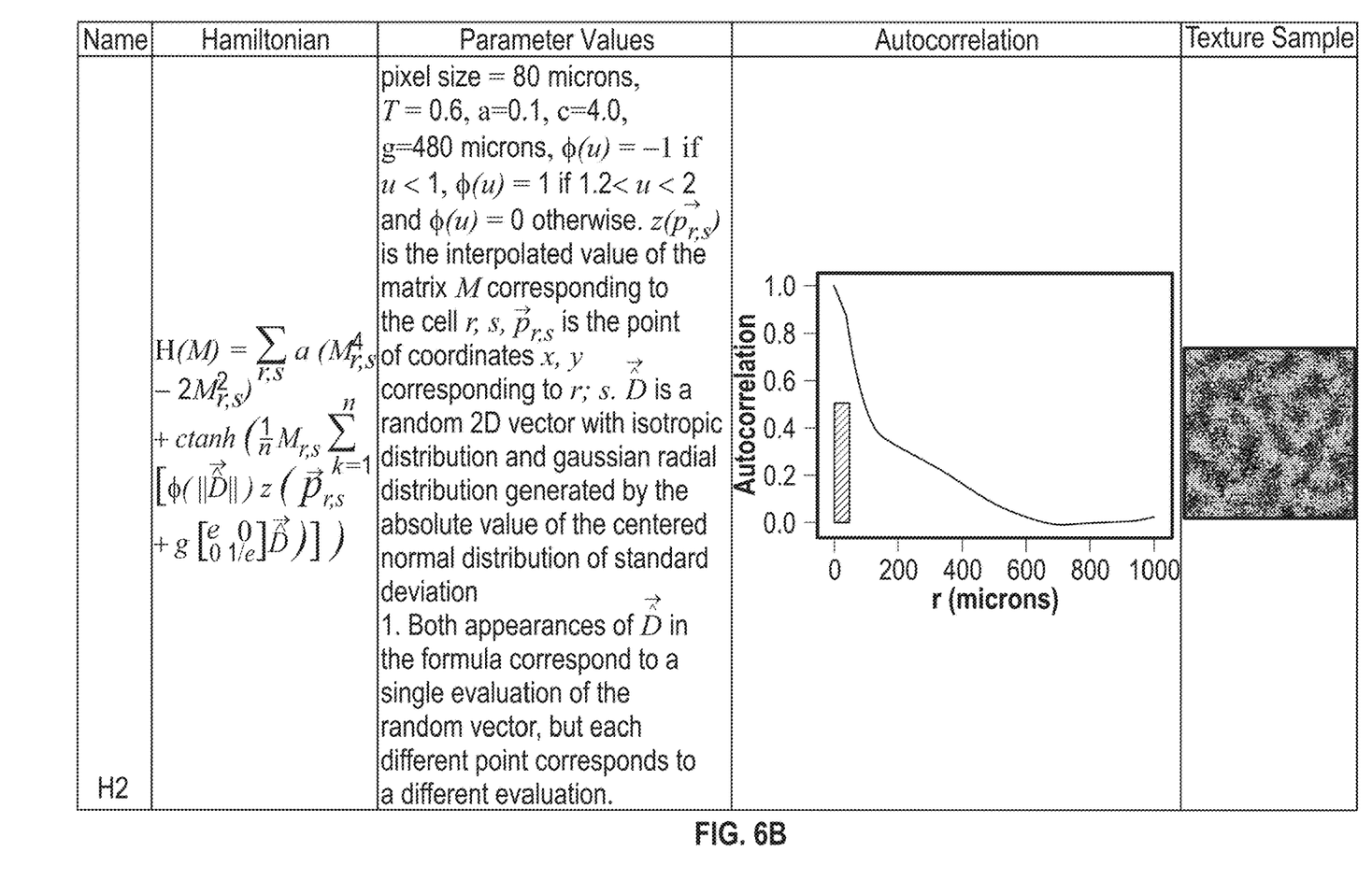
Figure 6C:
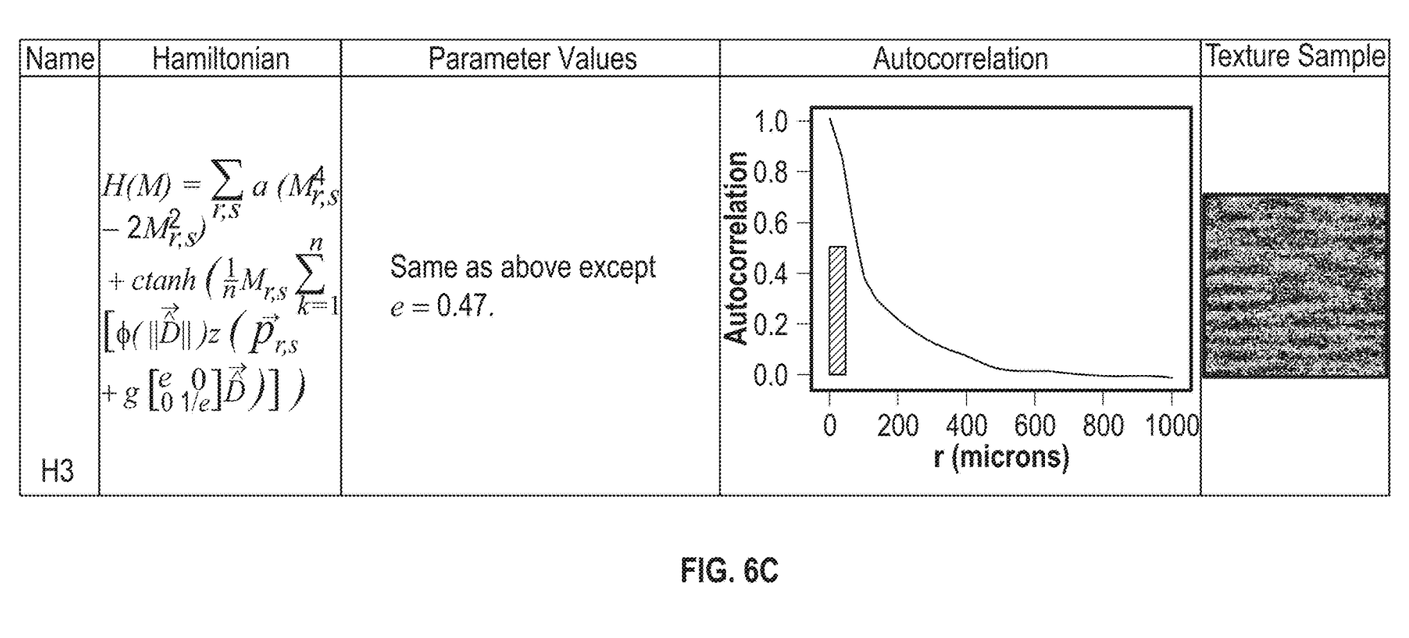

As discussed, the individual terms of the Hamiltonian used in the Metropolis-Hastings algorithm each correspond to different spatial patterns. FIGS. 6A-6C show exemplary Hamiltonians (or exemplary terms that are included (alone or in combination) in a Hamiltonian), the values of parameters used in the corresponding Hamiltonian (and in the Metropolis-Hastings algorithm), the autocorrelation functions of the resulting textures, and the resulting height maps the Hamiltonians respectively produce when used in the Metropolis-Hastings algorithm. In FIGS. 6A-6C, $(\Delta M)_{r,s}$, is defined as:

$$(\Delta M)_{r,s} = \frac{M_{r+1,s} + M_{r-1,s} + M_{r,s+1} + M_{r,s-1} - 4M_{r,s}}{\delta^2}$$

where δ is the pixel size. Notably, as shown in FIGS. 6A-6C, the autocorrelation functions for textures generated using H1, H2, and H3 are all greater than 0.5 for distances of less than 50 microns.

In some examples, by modulating or changing the values of parameters in the Hamiltonian, the texture (and/or the orientation of grains forming the texture) is directionally "stretched." For example, as shown in FIG. 6C, the texture corresponding to the Hamiltonian H3 is "stretched" in the horizontal direction relative to the texture corresponding to the Hamiltonian H2. In this example, changing the value of the parameter "e" in the Hamiltonian H3 causes the stretching. In other examples, depending on the parameters in the Hamiltonian and their respective values, the texture is stretched in the vertical direction (or in any arbitrary direction). One of ordinary skill in the art will understand that variable stretching across a texture (both in direction and magnitude) is obtained by modulating one or more parameters of the Hamiltonian (e.g., according to a function) responsible for the stretching effect.

In addition to spatially controlling the texture using the methods discussed above (e.g., by parametrizing the Hamiltonian using the terms in FIGS. 6A-6C), in some examples, the texture is controlled using depth modulation. In some examples, such depth modulation causes a macroscopic variation in texture depth (e.g., valleys and peaks) across a textured substrate. Macroscopic variation of texture depth may be desirable to create varying levels of gloss across a textured substrate. For example, the below discussed methods of macroscopic depth control produce a textured substrate with a first area having 2 gloss units (measured at 60 degrees incidence) and a second area having 8 gloss units (measured at 60 degrees incidence). Having gloss variation across a textured substrate may be desirable to enhance the aesthetic properties of textured substrates, especially when viewed from far away. For example, gloss variation across a textured substrate can enable a viewer to distinguish between different portions of the textured substrate, causing the textured substrate to appear "featured" (as opposed to uniformly shiny) when viewed from far away.

Figure 7:
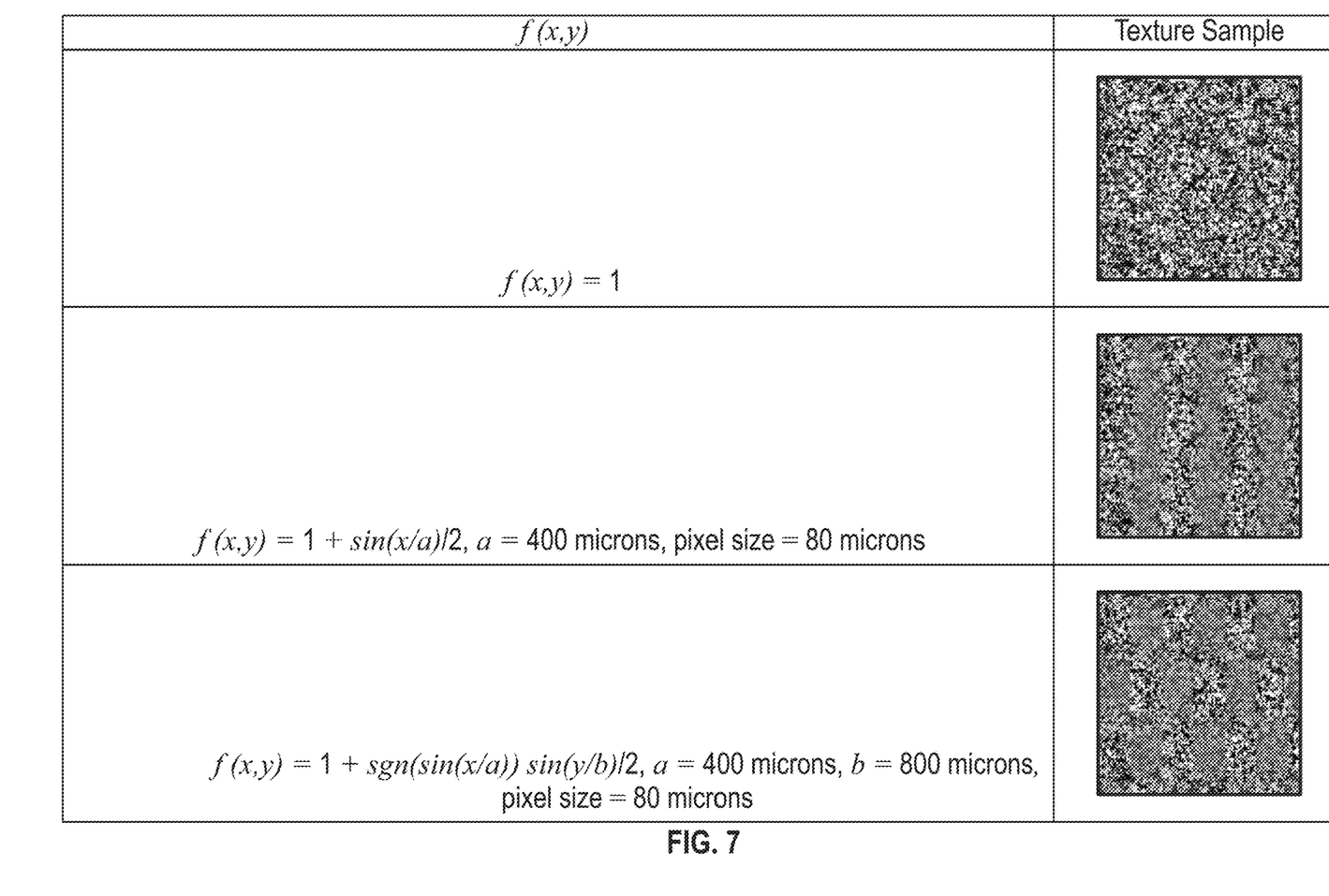
FIG. 7 illustrates exemplary macroscopic depth modulating functions f(x,y) and their respective resulting effects on textured substrates.

In some examples, to modulate the depth of a textured substrate, the height map of the textured substrate z(x.y) (e.g., as defined by matrix M) is multiplied by a function f(x,y) such that z'(x,y) is the height map used to generate the pattern for 3D printing and z'(x,y)=f(x,y)z(x,y). In some examples, z'(x,y)=tf(x,y)+f(x,y)z(x,y). f(x,y) is a function representing the macroscopic texture depth and f(x,y) is between 0.1 and 10. t is the depth of a macroscopic pattern superimposed onto the "microscopic" texture defined by z(x,y). FIG. 7 shows exemplary f(x,y) that are used to generate z'(x,y), and their respective resultant effect on the macroscopic depth of the textured substrate. For example, the f(x,y) shown in the second row causes the striped macroscopic variation in texture depth for the texture (e.g., the height map) shown in the first row and the f(x,y) shown in the third row causes the "tiled" macroscopic variation in texture depth for the texture shown in the first row.

As discussed, the disclosed depth modulation techniques create textured substrates with areas of different depths (e.g., as measured by root mean square (RMS)). For example, a first area of the textured substrate has a RMS depth between 20 microns to 1 millimeter, and a second area of the textured substrate has an RMS depth differing from the RMS depth of the first area by at least 20 percent. In some examples, the first area and the second area are each at least 4 square millimeters.

Figure 8A:
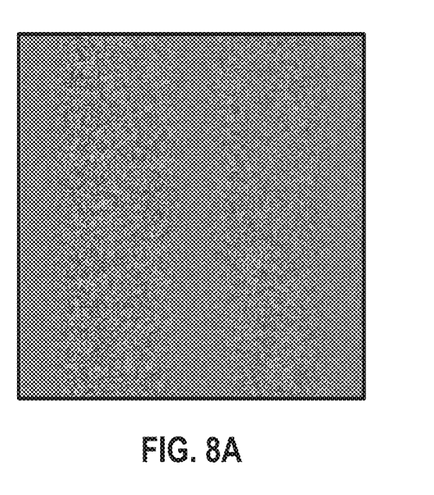
FIGS. 8A-8D respectively illustrate, an exemplary height map of a "tree bark" texture, the height map of the "tree bark" texture that has been macroscopically modulated in depth, a 3-D printed metal piece printed using the macroscopically modulated "tree bark" texture, and a glass piece pressed using the 3-D printed metal piece.
Figure 8B:
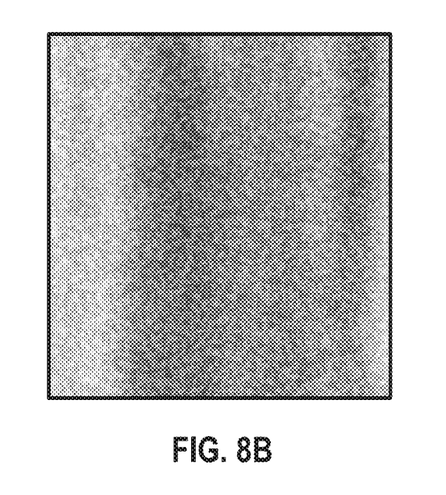
Figure 8C:
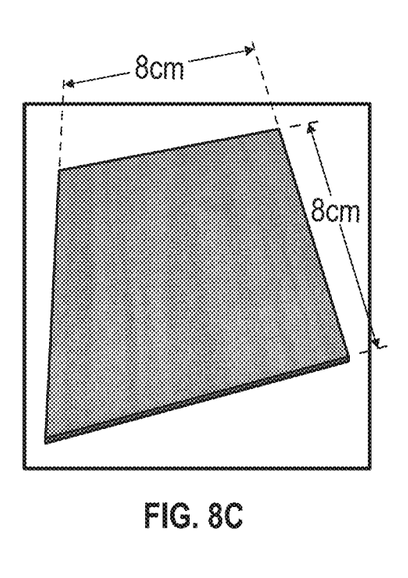
Figure 8D:
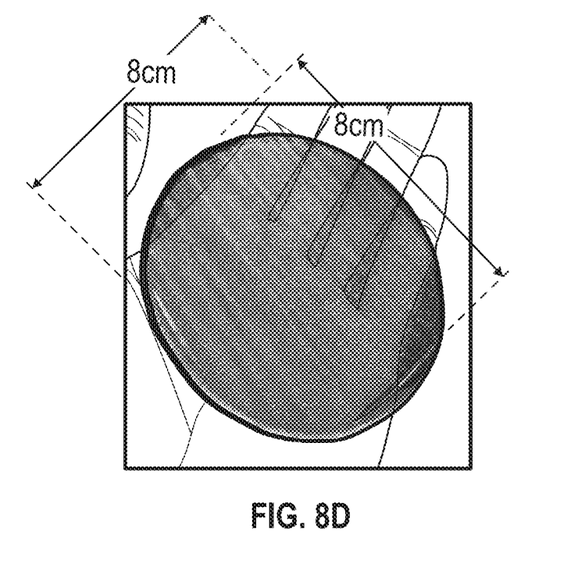

FIGS. 8A-8D demonstrate the effect of depth modulation on textured substrates. In particular, FIG. 8A shows a height map of a "tree bark" type texture for an approximately 2 cm×2 cm portion. The "tree bark" type texture is generated by modulating a spatially uniform texture (e.g., shown in FIG. 5A) with a function f(x,y) (e.g., a function corresponding to the height map of a picture of a tree bark pattern) representing the macroscopic texture depth variation. FIG. 8B shows the height map of a spatially uniform texture (e.g., FIG. 5A) modulated according to z'(x,y)=tf(x,y)+f(x,y)z(x, y), where f(x,y) is a function corresponding to the height map of a picture of a tree bark pattern. As shown in FIG. 8B, the macroscopic variation of texture depth (e.g., the dark and light streaks) is superimposed upon the microscopic texture variation (e.g., the pixels in FIG. 8B). FIG. 8C shows a metal surface of approximately 8 cm×8 cm (e.g., surface 204) 3-D printed using the texture of FIG. 8B. FIG. 8D shows a glass piece (e.g., a textured substrate) of approximately 8 cm×8 cm pressed using the metal surface of FIG. 8C. As shown in FIG. 8D, different portions of the glass piece have different gloss levels (e.g., some portions appear shinier than others). As shown, this causes the glass piece to appear more featured, as the peaks and valleys of the glass piece are readily distinguishable.

In some examples, the root mean square (RMS) roughness is used to characterize textured substrates (e.g., surfaces 204, 212, 214, 302, and 304 or the surfaces of textured glass 210 and 312) and/or the pattern defining the texture. The RMS roughness parameters (e.g., $R_{RMS}$ or $R_q$) are defined according to the BS EN ISO 4287:2000 standard. One of ordinary skill in the art would understand how to measure the RMS roughness (e.g., $R_{RMS}$ or $R_q$) for a textured substrate. In some examples, a textured substrate (or a portion thereof) produced using the disclosed techniques has an RMS roughness between 40 to 1000 microns. In some examples, the preferred RMS roughness is between 40 to 100 microns.

In some examples, the autocorrelation function is used to characterize textured substrates (e.g., surfaces 204, 212, 214, 302, and 304 or the surfaces of textured glass 210 and 312) and/or the pattern defining the texture. To compute the autocorrelation function for a textured substrate, let A be a portion of the textured substrate (e.g., a 25 square millimeter portion). An x-y system of Cartesian coordinates is defined tangent to the average orientation of the textured substrate. The x-y coordinates correspond to length units (e.g., meters). z(x,y) is the height of the textured substrate (relative to the average height).

Practically, measuring z(x,y) for a textured substrate involves measuring the value of z (e.g., using confocal microscopy) over a discrete set of values of (x,y). Accordingly, in some examples, the continuous function z(x,y) is interpolated from the discrete measurements of z using bilinear interpolation. In some examples, the continuous function z(x,y) is interpolated using a first order finite element basis according to a Delaunay triangulation.

To remove the effects of curvature of the substrate and the effects of the mean value of z on the autocorrelation function, Z(x,y) is defined as Z(x,y)=z(x,y)−P(x,y). P(x,y)=a+bx+cy+dxy is a first order polynomial fitted using the least squares method to the discrete measured values of z. Subtracting P(x,y) from z(x,y) thus removes the substrate curvature effects and the effects of the mean value of z from Z(x,y). Thus, the average of Z(x,y) is 0, and Z(x,y) is on average flat.

For a portion of the textured substrate in the range of $x_0 < x < x_1$ and $y_0 < y < y_1$, the autocorrelation function G(r) for $0 < r < \min((x_1-x_0)/4, (y_1-y_0)/4)$, $\Delta x = x_1 - x_0$, $\Delta y = y_1 - y_0$ is:

$$G(r) = \frac{2}{\pi r \Delta x \Delta y R_{RMS}^2}$$
$$\int_{x_0+\Delta x/4}^{x_0+3\Delta x/4} du \int_{y_0+\Delta y/4}^{y_0+3\Delta y/4} dv \int_0^{2\pi} d\theta Z\left(\frac{x_0+x_1}{2}+u, \frac{y_0+y_1}{2}+v\right)$$
$$Z\left(\frac{x_0+x_1}{2}+u+r\cos(\theta), \frac{y_0+y_1}{2}+v+r\sin(\theta)\right)$$

The above autocorrelation function can be calculated using any reasonable discretized integration method or using Monte-Carlo integration as long as $rd\theta$, du, and dv are each smaller than the horizontal measurement resolution (i.e., the distance between directly adjacent (x,y) coordinates for which z is measured). One of skill in the art would understand how to evaluate the above autocorrelation function for a textured substrate. For example, the autocorrelation function can be evaluated using a line scan obtained from a profilometer, the line scan having a length between 1 cm and 5 cm.

In some examples, the techniques discussed above produce textured substrates (and/or patterns defining textured substrates) such that, for a 5 mm×5 mm portion of the textured substrate, G(r)>0.5 for distances r less than 50 microns and G(r)<0.5 for distances r between 2 mm and 2.5 mm.

Figure 9:
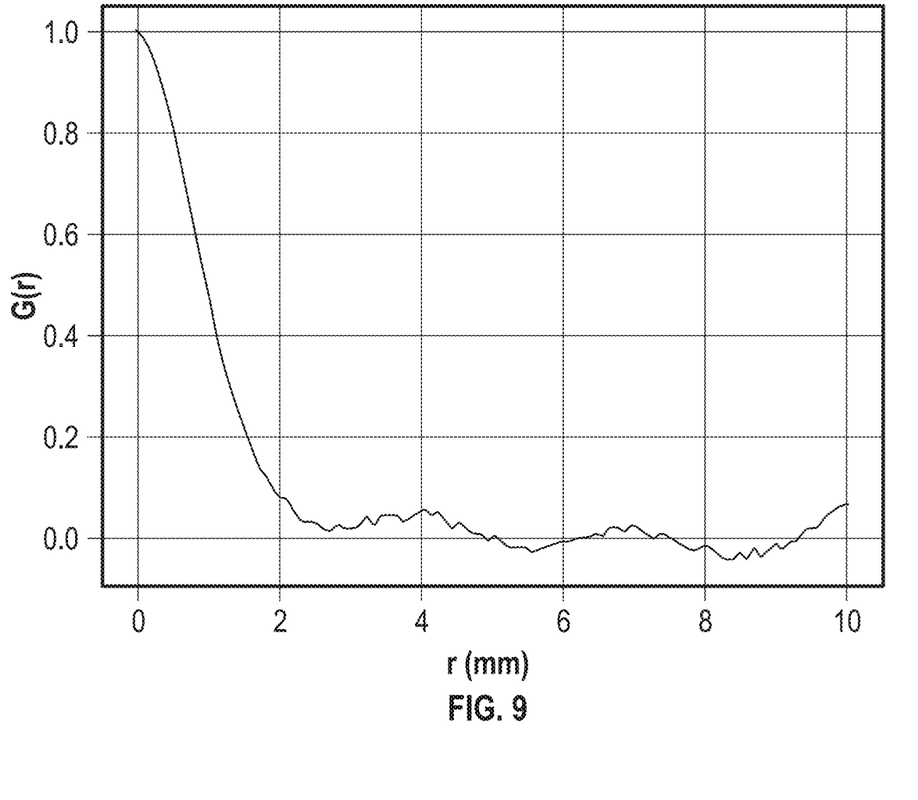
FIG. 9 illustrates the autocorrelation function for the textures shown in FIGS. 5A-5D.

FIG. 9 shows an exemplary autocorrelation function G(r) computed for the texture shown in FIGS. 5A-5D. As shown, the autocorrelation function in FIG. 9 falls within the above ranges.

Figure 10:
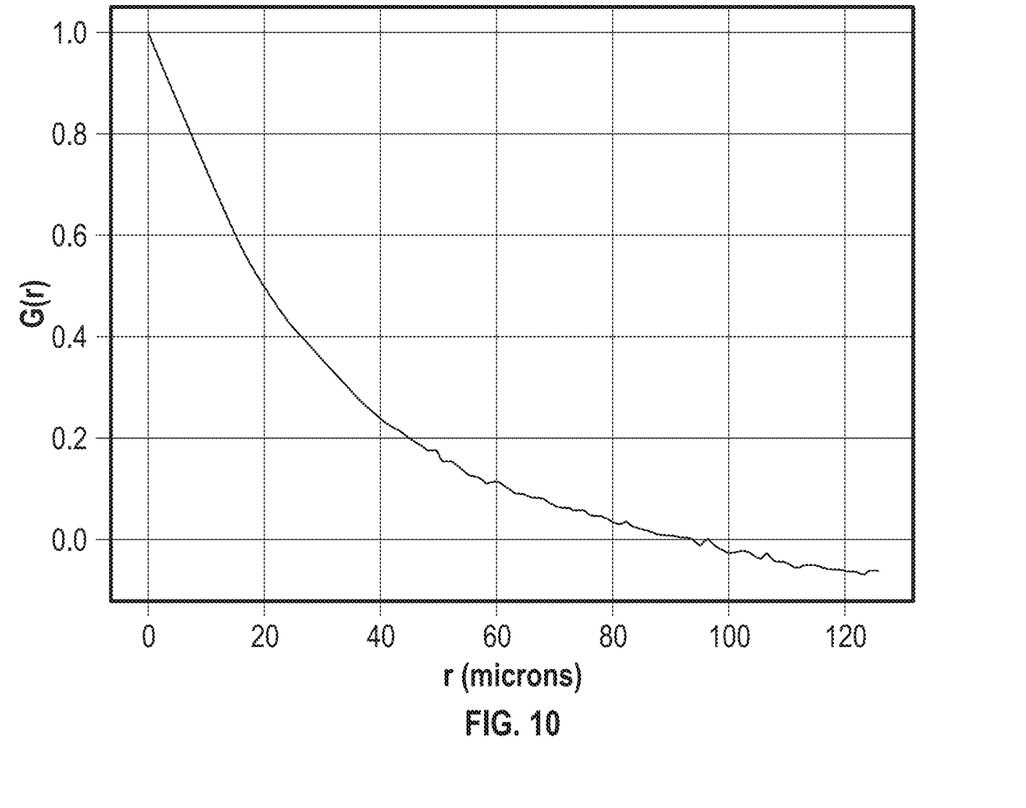
FIG. 10 illustrates an exemplary autocorrelation function for sandblasted glass.

The autocorrelation function can be used to distinguish textured substrates produced using the disclosed techniques from textured substrates produced using conventional techniques (e.g., sand blasting, chemical etching). In particular, the autocorrelation functions of flat substrates, sandblasted substrates, chemically etched substrates, and periodically patterned (e.g., with pyramids and grooves) substrates do not fall within the above mentioned ranges. For example, the autocorrelation function of sandblasted glass with a RMS roughness of 4 microns is shown in FIG. 10. As evident upon inspection, the autocorrelation function shown in FIG. 9 (corresponding to a textured substrate formed using the disclosed techniques) and the autocorrelation function of FIG. 10 (corresponding to sandblasted glass) are very different. In particular, as shown, G(r) for sandblasted glass is not greater than 0.5 for r less than 50 microns.

In some examples, Fourier transform methods are used to generate the texture of textured substrates. Exemplary Fourier transform methods include Gaussian-Free-Field Implementation and phase randomization of the Fourier transform of a picture. Generally, exemplary textures are obtained using Fourier transform methods by multiplying the average amplitude of a Fourier transform by a random value and by a positive real function corresponding to the desired texture. In particular, to obtain Z(x,y) defining a textured surface, the 2-D Fourier transform of Z(x,y), $F(k_x,k_y)$, is multiplied by a positive real function of $k_x$ and $k_y$ and by a Gaussian random variable for each $k_x$ and $k_y$. Here, the positive real function of $k_x$ and $k_y$ corresponds to the underlying patterning of the substrate (as defined in k-space) and the Gaussian random variable causes the features of the final textured surface (as defined by Z(x,y)) to appear random. The real part of the inverse Fourier transform of $F(k_x,k_y)$ (multiplied by a positive real function of $k_x$ and $k_y$ and by a Gaussian random variable for each $k_x$ and $k_y$) thus defines the final texture Z(x,y).

Substrates generated using the above discussed Fourier transform techniques are substrates having surfaces with Hurst statistics. In particular, F(k) (e.g., $F(k_x,k_y)$) has the form:

F(k)=0 for k<$k_0$;
F(k)=$Ck_1^{-2-2H}$ for $k_0$<k<$k_1$;
F(k)=$Ck^{-2-2H}$ for $k_1$<k<$k_2$; and
F(k)=0 for k>$k_2$.

Here, C is a constant, H is the Hurst exponent, 0<H<3, and $k=\sqrt{k_x^2+k_y^2}$.

Figure 11A:
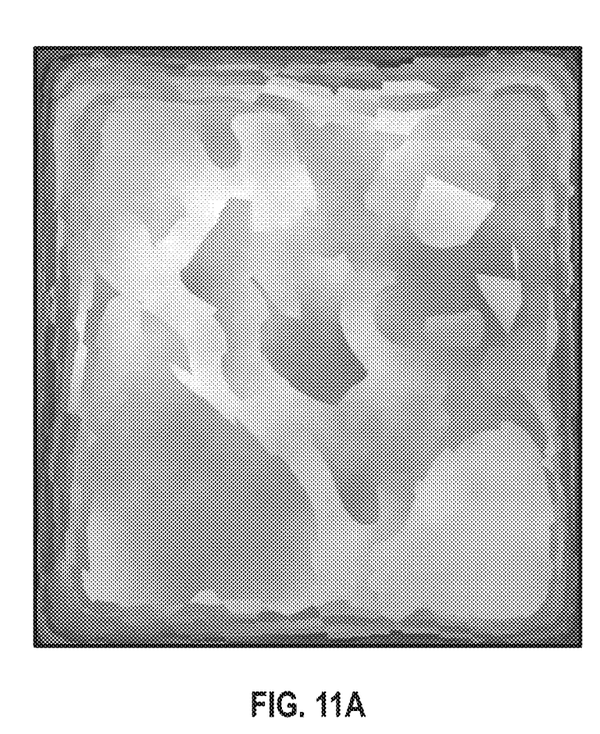
FIGS. 11A-11B respectively illustrate an exemplary texture generated using Fourier transform techniques and the 3-D mesh for the exemplary texture generated using Fourier transform techniques.
Figure 11B:
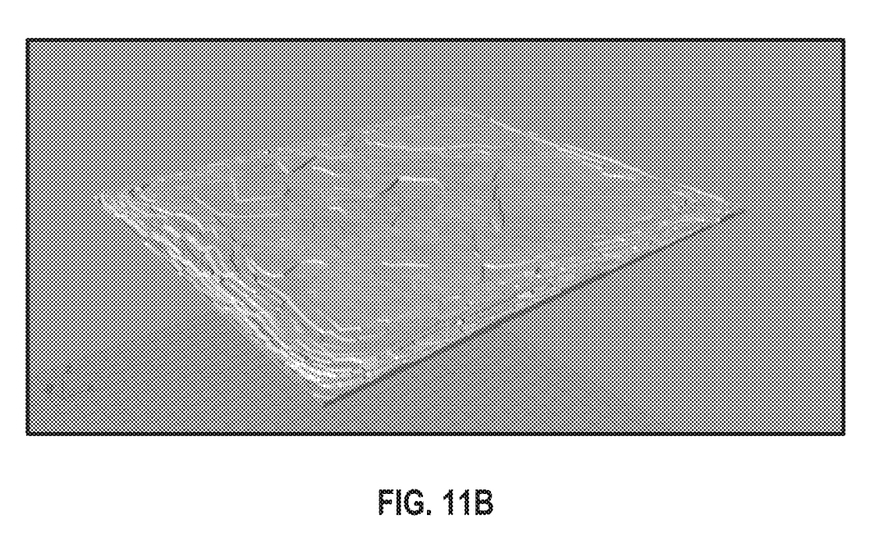

FIG. 11A shows an exemplary height map of a pattern generated using the discussed Fourier transform techniques. FIG. 11B shows the 3D mesh corresponding to the height map in FIG. 11A. As shown, each "patch" (e.g., a portion of the mesh or height map of approximately the same height) has different parameters (e.g., RMS roughness, C value, and Hurst exponent). One of skill in the art will understand that the Fourier transform $F(k_x,k_y)$ (and thus the C and H values) of a textured substrate can be readily computed from the measured heights of the textured substrate.

In some examples, textured substrates generated using the discussed Fourier transform techniques have a plurality of "patches" or portions with different and controllable Hurst exponents. Specifically, the choice of the positive real function of $k_x$ and $k_y$ the Fourier transform $F(k_x,k_y)$ is multiplied by controls the respective Hurst exponent values of the patches.

In some examples, a textured substrate produced using the discussed Fourier Transform methods include a plurality (e.g., two or more, three or more, etc.) of portions, where each portion has a different H exponent (e.g., differing from the Hurst exponent of every other portion by at least 20 percent). For example, a first portion has a first Hurst exponent, and a second portion has a second Hurst exponent differing from the first Hurst exponent by at least 20 percent. In some examples, the first portion and the second portion have respective areas of at least 4 square millimeters.

In some examples, spatial point processes, such as the Poisson point process, are used to generate the z(x,y) (e.g., the matrix M) defining the texture for textured substrates. In particular, the Poisson point process chooses randomly, from a set of N random points, a point $z_n$ corresponding to $x_n$ and $y_n$. A localized function f is than added to that point such that $z_{n+1}=z_n+f(x-x_n, y-y_n)$. Similar to the macroscopic depth modulation techniques discussed above, in some examples, the localized function f is also modulated to create macroscopic depth variation across the texture defined by z(x,y).

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best utilize the invention and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A textured substrate, comprising:
   a first surface having a first portion textured to include:
   a root mean square roughness between 40 to 1000 microns; and
   an autocorrelation function greater than 0.5 for distances less than 50 microns,
   wherein the autocorrelation function of the first portion is less than 0.5 for distances between 2 millimeters and 2.5 millimeters.

2. The textured substrate of claim 1, wherein the textured substrate comprises glass.

3. The textured substrate of claim 1, wherein the textured substrate comprises metal.

4. The textured substrate of claim 3, wherein a texture of the first portion is formed by 3-D printing.

5. The textured substrate of claim 1, wherein the first portion has an area of at least 25 square millimeters.

6. The textured substrate of claim 1, wherein the root mean square roughness of the first portion is between 40 to 100 microns.

7. The textured substrate of claim 1, wherein the first portion is textured in a user-specified pattern.

8. The textured substrate of claim 7, wherein a texture of the first portion comprises a plurality of grains, and wherein the user-specified pattern defines the respective orientations of the plurality of grains and the respective shapes of the plurality of grains.

9. The textured substrate of claim 8, wherein a stereo lithography (STL) or a computer aided design (CAD) file defines the user-specified pattern.

10. The textured substrate of claim 1, wherein a first area of the first surface has a first root mean square depth between 20 microns and 1 millimeter, and wherein a second area of the first surface has a second root mean square depth differing from the first root mean square depth by at least 20 percent.

11. The textured substrate of claim 10, wherein the first area and the second area are each at least 4 square millimeters.

12. The textured substrate of claim 10, wherein the first area has at least 2 gloss units measured at 60 degrees incidence, and wherein the second area has at least 8 gloss units measured at 60 degrees incidence.

13. A system for texturing a substrate comprising:
   a plunger with a first textured surface, wherein the first textured surface has:
   a root mean square roughness between 40 to 1000 microns; and
   an autocorrelation function greater than 0.5 for distances less than 50 microns,
   wherein the first textured surface is ceramic coated with a layer of chromium.

14. The system of claim 13, wherein a texture of the first textured surface is formed by 3-D printing.

15. The system of claim 13, further comprising a base component.

16. The system of claim 15, further comprising a ring positioned above the base component.

17. The system of claim 13, wherein the plunger includes one or more hollow channels.

18. The system of claim 13, additionally comprising a pattern defining a texture, the texture applied to a first surface of the plunger.

19. The system of claim 18, wherein the pattern comprises a 3-D printed textured surface.

20. The system of claim 19, wherein the 3-D printed textured surface of the plunger comprises an additive laser sintered 3-D printed textured surface.

21. The system of claim 13, wherein the system is configured to texture a substrate comprising a first area and a second area and wherein the first and the second area are at least four square millimeters.

22. The system of claim 21, wherein a Hurst exponent of the first area differs from a Hurst exponent of the second area by at least 20 percent.

23. A textured substrate, comprising:
   a first surface having a first portion textured to include:
   a root mean square roughness between 40 to 1000 microns; and
   an autocorrelation function greater than 0.5 for distances less than 50 microns,
   wherein a first area of the first surface has a first root mean square depth between 20 microns and 1 millimeter, and wherein a second area of the first surface has a second root mean square depth differing from the first root mean square depth by at least 20 percent.

24. A system for texturing a substrate comprising:
   a plunger with a first textured surface, wherein the first textured surface has:
   a root mean square roughness between 40 to 1000 microns; and
   an autocorrelation function greater than 0.5 for distances less than 50 microns,
   wherein the system is configured to texture a substrate comprising a first area and a second area and wherein the first and the second area are at least four square millimeters, and wherein a Hurst exponent of the first area differs from a Hurst exponent of the second area by at least 20 percent.

\* \* \* \* \*

UNITED STATES PATENT AND TRADEMARK OFFICE
CERTIFICATE OF CORRECTION

| | |
|---|---|
| PATENT NO. | : 11,220,450 B2 |
| APPLICATION NO. | : 16/269032 |
| DATED | : January 11, 2022 |
| INVENTOR(S) | : William S. Sweney |

It is certified that error appears in the above-identified patent and that said Letters Patent is hereby corrected as shown below:

In the Claims

Column 11, Line 62, Claim 9, delete "claim 8," and insert -- claim 7, --.

Signed and Sealed this
Twenty-third Day of August, 2022

*Katherine Kelly Vidal*

Katherine Kelly Vidal
*Director of the United States Patent and Trademark Office*